United States Patent
Alsop et al.

(10) Patent No.: US 6,795,829 B2
(45) Date of Patent: Sep. 21, 2004

(54) METHOD FOR BUILDING A PERIPHERAL INFORMATION DATABASE

(75) Inventors: Abraham D. Alsop, Boise, ID (US); Brian E. McKinley, Boise, ID (US); Catherine R. Markle, Boise, ID (US); Corey J. Norris, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 512 days.

(21) Appl. No.: 09/874,791

(22) Filed: Jun. 4, 2001

(65) Prior Publication Data

US 2002/0194180 A1 Dec. 19, 2002

(51) Int. Cl.[7] .................................................. G06F 7/00
(52) U.S. Cl. ...................... 707/102; 707/100; 707/101; 707/104.1
(58) Field of Search ................... 707/1–10, 100–104.1; 709/217–219, 223–225, 227–229, 318, 328; 370/449; 710/8, 15–19, 29, 46, 200; 714/100, 1, 47–48, 49; 705/400

(56) References Cited

U.S. PATENT DOCUMENTS

| 5,323,393 | A | * | 6/1994 | Barrett et al. ............... 370/449 |
| 5,537,626 | A | * | 7/1996 | Kraslavsky et al. ........... 710/8 |
| 5,659,795 | A | * | 8/1997 | Duvall et al. ................. 710/15 |
| 5,715,477 | A | * | 2/1998 | Kikinis ........................ 710/68 |
| 5,784,622 | A | * | 7/1998 | Kalwitz et al. ............. 710/200 |
| 5,828,863 | A | * | 10/1998 | Barrett et al. ................. 703/24 |
| 5,828,864 | A | * | 10/1998 | Danknick et al. ............. 703/24 |
| 5,832,298 | A | * | 11/1998 | Sanchez et al. ................ 710/8 |
| 5,862,404 | A | * | 1/1999 | Onaga ............................ 710/8 |
| 5,903,733 | A | * | 5/1999 | Hong ......................... 709/232 |
| 5,975,737 | A | * | 11/1999 | Crater et al. ................... 700/9 |
| 6,138,249 | A | * | 10/2000 | Nolet ........................... 714/25 |
| 6,219,719 | B1 | * | 4/2001 | Graf ............................. 710/1 |
| 6,266,693 | B1 | * | 7/2001 | Onaga ......................... 709/219 |
| 6,463,430 | B1 | * | 10/2002 | Brady et al. .................... 707/3 |
| 6,532,491 | B1 | * | 3/2003 | Lakis et al. ................. 709/223 |

* cited by examiner

*Primary Examiner*—Greta Robinson
*Assistant Examiner*—Linh Black

(57) ABSTRACT

A novel method for building a computer peripheral information database for a plurality of peripherals operably connected to a network for sharing between a plurality of users provide a valuable tool for network management and administration. A preferred embodiment of the method is for use with networked printers. Configuration data for the printer is input by at least one user, and printer usage data is obtained by repeated queries over the network to the printers. The information database will contain printer duty cycle and cost data for each of the printer.

22 Claims, 4 Drawing Sheets

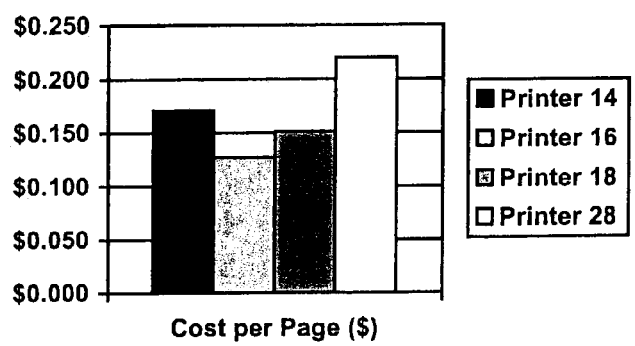
Figure 5: Sample Printer Information Database Data
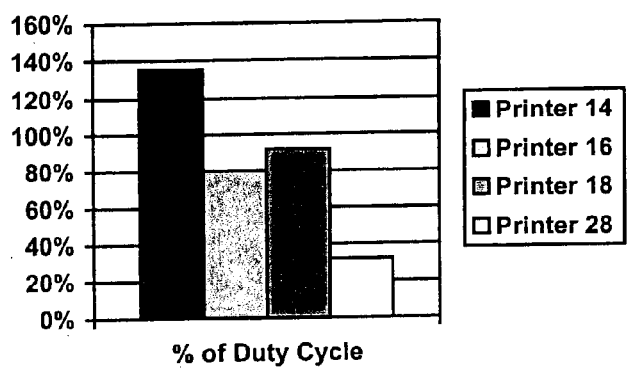
Figure 6: Sample Printer Information Database Data

METHOD FOR BUILDING A PERIPHERAL INFORMATION DATABASE

FIELD OF THE INVENTION

The present invention is related to a method for building information databases for devices. More particularly, the present invention is related to building information databases useful for device management and administration for computer peripherals.

BACKGROUND OF THE INVENTION

Computer peripherals such as printers, scanners, terminals, and other devices have become widespread. Often, these devices are connected by a communications network that allows for sharing of the devices among many users. As an example, a communications network that has a plurality of individual users may have only a few printers connected to the network which all of the users share. Printer jobs are sent by any of the users over the network to one or more of the printers for printing. In some instances, the network may span significant geographical distances so that a particular printer used may be far removed from the user.

In these shared peripheral environments, the administration and management of the shared peripherals may be difficult. It is helpful to have accurate data regarding the use and cost of the peripherals. This data allows organizations to accurately determine the cost of operating the peripheral devices. Because the peripherals may be far removed from one another and are used by a plurality of different users, however, this data is often difficult to obtain.

In addition to existing difficulties with the accounting administration of shared peripherals, other problems exist with the general management of the devices. To maximize efficiency of the shared peripherals, it is important to have general usage patterns for the devices. With these patterns, adjustments to the distribution of the devices or to the workflow to the devices can be changed. By way of example, it may be discovered that a certain networked printer has a very high workload, while another has a very low workload. Efficiency could be increased by re-directing work from the first printer to the second, or the second printer could be moved closer to the first.

Heretofore, only limited usage data has been available from the devices, and obtaining this data in meaningful quantities has sometimes required inordinate time, expense, and network bandwidth resources. There are, therefore, unresolved needs for methods for building peripheral information databases.

SUMMARY OF THE INVENTION

The present invention is directed to building an information database for a plurality of network peripherals. The method generally comprises the steps of repeatedly querying the plurality of peripherals for output count data, obtaining peripheral cost data, and building the information database using the output count data and the cost data. The information database comprises at least an operating cost for the peripheral. Preferably, the method uses a central computer to repeatedly query the plurality of peripherals over the network, to obtain the cost data, and to build the information database. Additionally, the step of building the peripheral information database preferably further comprises calculating at least a duty cycle ratio for the peripheral.

In a preferred embodiment of the method of the invention, the peripheral comprises a printer. In this embodiment, the output count data obtained from the printer comprises a page count, and the cost data comprises at least a printer fixed cost value. More preferably, a printer duty cycle is obtained, the cost data further comprises variable cost data, and additional data comprising color page count, page count by paper size, and marking agent level data are obtained through repeated querying of the printer. The preferred printer information database comprises at least a printer operating cost value reported on a per page basis and a duty cycle ratio.

Additional preferred steps of the method comprise selectively querying a designated portion of the printers at a higher frequency than a remaining portion. In particular, a first portion of the printers may be designated as high use, and a second portion designated as low use. The high use printers are then queried at a first frequency and the low use printers at a second frequency, with the first frequency being greater than the second frequency. These preferred sets of method steps advantageously decrease network traffic associated with querying the peripherals for usage data.

It will be appreciated that the method of the invention as herein described is well suited for practice by a computer. The present invention will therefore be further understood to comprise a computer program product comprising means recorded on a computer readable medium that may comprise any of an optically readable disk, a magnetic disk, or like medium, for causing a computer to perform the various steps of the method of the invention.

The above brief description sets forth rather broadly the more important features of the present disclosure so that the detailed description that follows may be better understood, and so that the present contributions to the art may be better appreciated. There are, of course, additional features of the disclosure that will be described hereinafter which will further describe the subject matter of the invention. In this respect, before explaining an embodiment of the disclosure in detail, it is to be understood that the disclosure is not limited in its application to the details of the construction and the arrangements set forth in the following description or illustrated in the drawings. The present invention is capable of other embodiments and of being practiced and carried out in various ways, as will be appreciated by those skilled in the art. Also, it is to be understood that the phraseology and terminology employed herein are for description and not limitation.

BRIEF DESCRIPTION OF THE DRAWINGS

FIG. 5 is a chart showing sample printer information database data.

FIG. 6 is a chart showing sample printer information database data.

DETAILED DESCRIPTION

Turning now to the Drawings, an embodiment of the invention will be described in detail with reference to a hypothetical communications network having a plurality of users and peripherals distributed about the network for sharing by the users. Through practice of this embodiment of the invention, a central computer connected to the network will be used to gather peripheral usage and configuration data, and to build a peripheral information database from this data.

Figure 1:
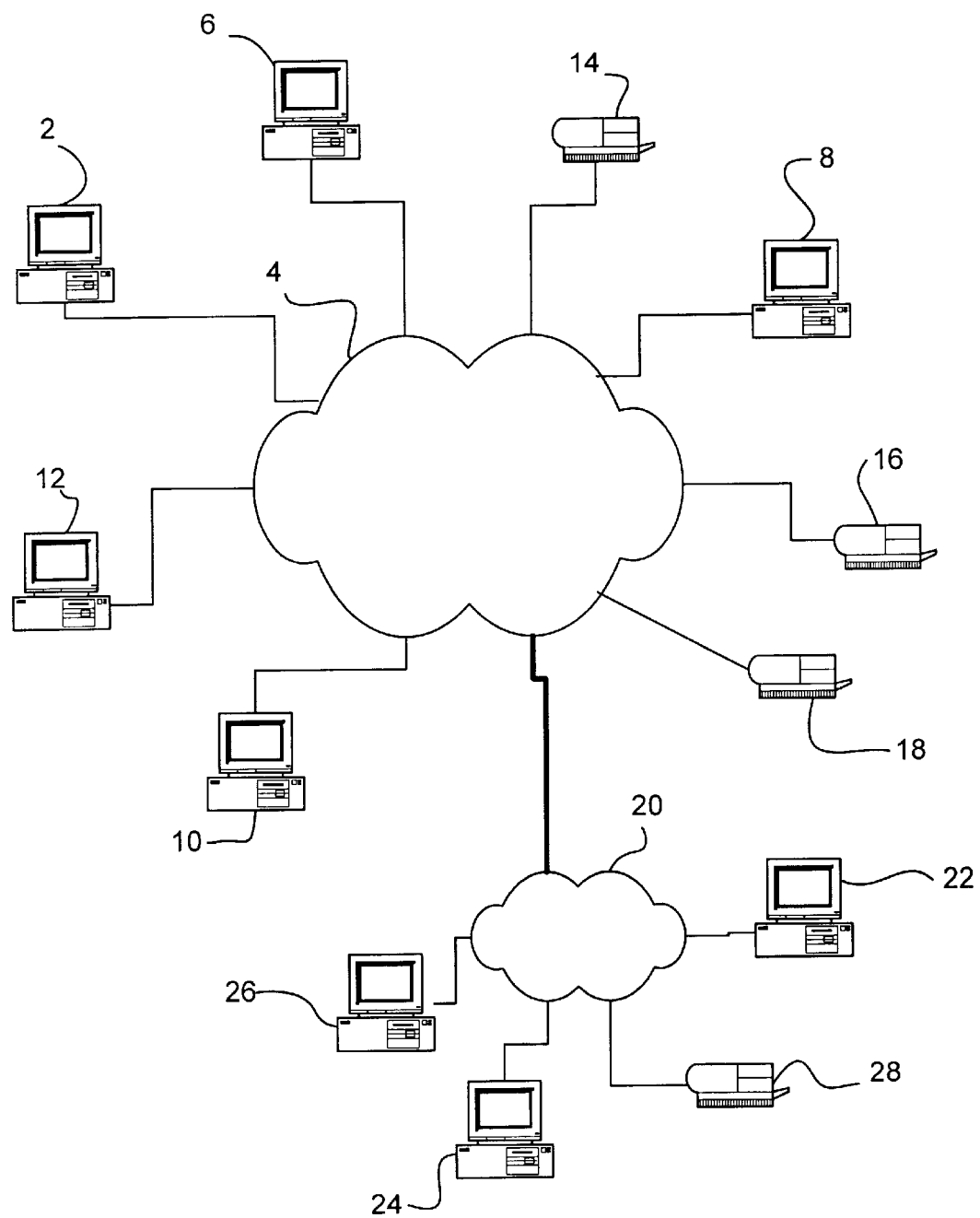
FIG. 1 is a schematic of a hypothetical network useful in illustrating an embodiment of the method of the invention.

Accordingly, FIG. 1 is a schematic diagram of the network configuration for the hypothetical Acme Corp. that will be useful in illustrating this preferred embodiment of one method of the invention. A central computer 2 is operably connected to a communications network 4. A plurality of individual computer users 6–12 (illustrated as computers in FIG. 1) and a plurality of printers 14–18 are connected to the communications network 4. Additionally, Acme has a remote office with a network loop 20 connected to the network 4. The network loop 20 further has a plurality of individual computer users 22–26, as well as a printer 28.

As used herein, the term "communications network" is intended to refer to a broad array of configurations that are capable of facilitating data transfer between computer devices. By way of example and not limitation, a communications network may comprise a local or wide area communications network ("LAN" or "WAN"; respectively) that utilizes wire, coaxial cable, fiber optic, or other connections; a wireless network; a telephone network; or the like. Also, as used herein the term "computer" and "computer device" are intended to refer to a wide variety of devices capable of processing data. Once again by way of example and not limitation, a computer or computer device as used herein may comprise a personal computer, a mainframe computer, a client terminal, a server host, a processor based handheld device, or an article of machinery that contains a processor.

Because the printers 14–18 and 28 are all operably connected to the communications network 4, they may all operably communicate over the network 4 with all other computer devices connected thereto. In particular, any of the plurality of the computer users 6–12 or 22–26 may send print jobs to any of the printers 14–18 or 28. Each of the plurality of printers 14–18 and 28 is preferably provided with a unique identity. When one of the computer users 6–12 or 22–26 has a job for printing, they may select one of the printers 14–18 or 28 to send the job to by using the particular printer unique identity. Users may select printers that are located close to them, or may select printers that have capabilities required for the particular print job. As discussed herein above and as appreciated by those knowledgeable in the art, a configuration as illustrated in FIG. 1 featuring a plurality of networked printers that may be shared by a plurality of individual users is common.

Through the preferred embodiment of the method of the invention, a printer information database will be built. As an initial step of this embodiment of the method of the invention, a database shell is created and stored on the central computer 2. The database has fields for information sets regarding each of the printers 14–18 and 28. To build the printer information database, the individual fields are filled with two general types of printer data: printer usage data and printer configuration data. Printer usage data will be obtained by automated polling of the printer devices themselves, while printer configuration data will be input by one or more users.

It will be appreciated that although FIG. 1 illustrates a network configuration with only several printers and computer users and only a single central computer the method of the invention is not limited to practice with any particular number of users, printers, or central computers. FIG. 1 has been presented with the numbers of printers, a single central computer, and computer users as illustrated only for purposes of simplicity of describing the practice of the method of the invention in detail. Indeed, it will be appreciated that the invention may in fact have greater utility for networks that feature a multiplicity of computer users and printers that are served by a plurality of central computers 2, as they will suffer most acutely the many heretofore unresolved difficulties with network peripheral management and administration that were discussed herein above.

Figure 2:
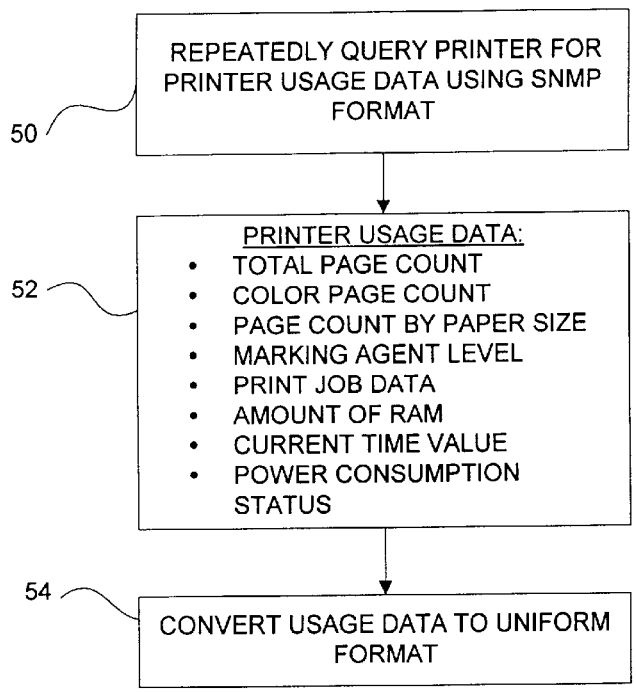
FIG. 2 is a flow chart illustrating a subset of steps of an embodiment of the method of the invention.

FIG. 2 is a flow chart illustrating a preferred subset of steps of this embodiment of the invention used to obtain the printer usage data. An individual printer is repeatedly queried for the printer usage data, preferably using SNMP ("Simple Network Management Protocol") network management protocol format (50). It is noted that SNMP is a preferred protocol only, and is not the only protocol that may be used within the practice of the invention for performing queries by the central computer 2 to the printers 14–18 and 28.

Indeed, several alternative protocols for communicating over the network 4 exist and will continue to become available that will be useful in the practice of the method of the invention, as will be appreciated by those knowledgeable in the art. By way of example and not limitation, communications protocols such as HTTP, HTML, FTP, Telnet and WML may be used in practice of the method and program product of the invention. These protocols, however, are generally communications protocols only, and not management protocols as is SNMP. Use of these protocols may thereby require additional effort over use of SNMP. That is, SNMP has been specifically developed for purposes of managing computers and peripheral devices over a network. Further, many manufacturers currently pre-install SNMP functionality in their devices, with an example being a printer manufacturer that may pre-install SNMP functionality in its printer for reporting a total page count.

Referring once again to the flowchart of FIG. 2, the repeated querying of the printers (50) results in obtaining printer usage data (52). This preferred printer usage data set preferably comprises at least a printer total page count, color page count, page count by paper size, marking agent level, print job data, amount of RAM available, a current time value, and power consumption status. It is noted that a current time value may be obtained by querying a printer, a time value may of course also be obtained from querying any of several resources on the network 4, including the central computer 2 itself. It is also noted that as used herein the term "marking agent" is intended to refer to an agent used for marking a substrate with characters. By way of example, a "marking agent" may comprise ink in the case of an ink jet printer, or toner in the case of a laser jet printer.

It is further noted that some modem printers will report an amount of marking agent available, typically in a "level full" ratio (e.g. "25% marking agent remaining"). For these devices, obtaining a marking agent level will be straightforward. Almost all printers of the past, however, as well as some of the present and future, will not have the capability to report a marking agent level over the network. For these devices, the method of the invention may require an additional step of users reporting to the information database a time when marking agent has been changed. The information database can then extrapolate an approximate marking level value over a period of time by assuming linear use of the marking agent per page printed over the time that the marking agent went between re-fills. This value can further be used to predict remaining marking agent life in future periods.

By way of example, assume it is reported that marking agent was replaced at a page count of 10,000 and again at a page count of 11,000. With these values it could be assumed that the marking agent was completely used to print 1000 pages, and therefore that each page consumed 0.1% of the marking agent. A marking agent level could then be extrapolated for any page value (or corresponding time value) between page count 10,000 and page count 11,000. Additionally, at page count 10,500 it could be estimated that the current marking agent was 50% consumed, and that a new marking agent container would be required in 500 pages, or in the predicted time elapsed for 500 pages to print. In this manner the method of the invention can be used to advantageously predict when marking agent may need to be replaced for printers that do not have a marking agent level reporting capability.

In addition, further steps of another embodiment of the invention could comprise "error checking" logic to insure the accuracy of the method of the invention. In particular, the method may comprise steps of storing marking agent consumption rates for each printer over time, and comparing newly obtained rates with stored historical rates. If a significant change in rate was detected, an additional step of "flagging" or eliminating data which is likely erroneous. By way of example, if a printer had been averaging 1000 pages per cartridge over time, and a new calculation results in the printer only printing 4 pages per cartridge, this data could be excluded from consideration.

Again referring to the usage data items of FIG. 2 (52), the usage item identified as "print job data" is intended to refer to data regarding printer jobs that may be stored by the printer. By way of example, a given printer may store a record of what user printed what jobs when, what the job consisted of, and what wait time was experienced in printing the job. The usage data "amount of RAM" refers to availability of random access memory or other print job storage medium capacity available. Power consumption status refers to the current power consumption level of the printer. That is, some printers have a plurality of power consumption status settings depending on their current activity. As an example, a printer may have "printing", "waiting", and "power save" power consumption modes. The printer consumes different levels of power in each of these modes.

Referring again to FIG. 2, after obtaining the printer usage data (50–52), the SNMP format usage data is converted to a uniform format that will be used for the information database (54). Preferably, the database is built using a widely available commercial format such as SQL or Microsoft Access or Excel, so that it will be easily readable by many users.

The steps described in FIG. 2 (50–54) will be executed for each of the plurality of networked printers 14–18 and 28, with data obtained from each printer then placed in a portion of the database associated with that printer. For this reason the method of the invention may further comprise the step of querying the printer for its identification, which may be provided by way of example as a unique network address.

The central computer 2 will perform its repeated usage data querying steps (50–54) at a desired frequency. Generally, more frequent querying is preferred as it provides smaller time increments between data points and therefore greater data accuracy for values that will be averaged over time. High frequency polling must be balanced, however, against its disadvantageous network traffic effects. That is, the transfer of data between each of the various printers and the central computer 2 requires bandwidth on the network 4, which has cost associated with it and which also can contribute to network congestion. It has been discovered that the method of the invention can be practiced on current typical network configurations with good success using preferred query frequencies of at least once per day and a maximum of several times per hour. A query frequency of once per hour has been discovered to be a useful starting point for the practice of the method of the invention, with adjustments made thereto as required.

Network congestion considerations become more acute for networks with a multitude of printers to be queried and for networks that may be near to bandwidth maximum limits. An embodiment of the invention further comprises additional steps that will be of utility under these circumstances. In particular, the present invention may be practiced to selectively query only selected printers or to query for only specified high priority data from printers to minimize bandwidth used. As an example, it may be discovered that the printers 14 and 18 of FIG. 1 are used at a high volume, and that the printers 16 and 28 are used at much lower volume. If network congestion is of concern, the present invention may further comprise specifying the printers 14 and 18 as "high use printers" and the printers 16 and 28 as "low use printers".

Through this embodiment of the invention, a first query frequency will be set for the high use printers and a second query frequency for the low use printers, with the first query frequency being greater than the second query frequency. This invention embodiment has the advantageous effect of lowering overall network traffic associated with the printer querying.

An additional embodiment of the method of the invention comprises an alternate subset of steps useful for accommodating network traffic concerns. Like the subset discussed above, this alternate subset also comprises selective querying of printers. Instead of designating certain printers as "high use" to be queried at a higher rate, however, this alternate subset generally comprises specifying some printer usage data as "high priority" and other data as "low priority". High priority printer data may preferably comprise at least a page count and a marking agent level. Low priority data may comprise page count by paper size, amount of RAM, and color page count.

A first query frequency is specified for the high priority data and a second query frequency for the low priority data, with the first frequency higher than the second frequency. All printers will be polled at the first frequency for high priority data only, and queried at the second frequency for low priority data only. Thus smaller data packets are sent over the network at the higher first frequency, thereby reducing network congestion as compared to sending larger data packets at that same frequency.

For both of the alternate preferred subsets of method steps useful for reducing network congestion, the particular values for first and second frequencies will of course vary with the particular network conditions. It is estimated that setting a first query frequency that is at least twice that of a second query frequency is of utility in the practice of the invention.

Also, it is noted that both these preferred subsets of congestion reducing steps are not exclusive to one another. Indeed, it will be appreciated that they may be practiced in combination with one another. That is, high use printers may have high and low priority data. Additionally, a plurality of usage and priority classifications as well as poling frequencies could of course exist between "high" and "low".

Figure 3:
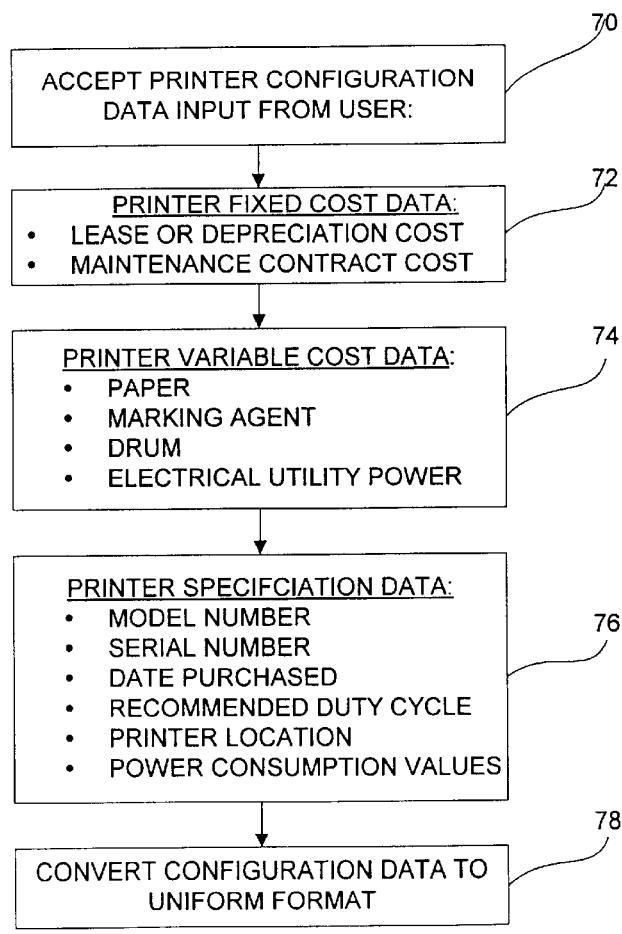
FIG. 3 is a flow chart illustrating an additional subset of steps of an embodiment of the method of the invention.

FIG. 3 is a flowchart illustrating a subset of steps used in the preferred method embodiment used to obtain printer configuration data. The central computer first accepts printer configuration data from a user (70). This may be accomplished for example by providing a page with data fields for filling out for user access. The data to be provided by the user generally comprises data not available from the printer hardware itself. This user configuration data generally comprises at least cost data (fixed and variable), and default printer performance data.

FIG. 3 summarizes printer fixed cost data to be provided by a user (72). Generally, these costs are those associated with the printer and known as "fixed" in the accounting art. In essence, the fixed cost represents the actual cost of the printer device to the device owner, regardless of its operation. That is, even if the device is not operated and provides no output, it will cost this much to the owner. The primary fixed cost is the printer lease or depreciation cost. An additional common fixed cost is the cost of a fixed price maintenance contract for the printer.

FIG. 3 illustrates a preferred set of variable cost items to be provided by the user (74). As will be appreciated by those knowledgeable in the accounting arts, variable cost items may generally be described as the cost of supply items consumable by the printer device in producing its output. For a printer, these items may preferably comprise at least paper, marking agent, and electrical utility values. Units for reporting these values may vary, but will need to be consistent with units of printer usage data and with units for printer information database calculations that will be discussed herein below.

In addition to cost data, FIG. 3 summarizes the preferred printer specification data to be entered by a user (76). Generally, this data represents information that may be provided by the hardware vendor or other industry source, as well as data that is not readily available from a network query to the printer such as the printer location. The preferred set of specification data provided (74) comprises a printer model number, serial number, date purchased, a recommended duty cycle, and power consumption rates in the different printer power consumption modes. An example of a manufacturer recommended maximum duty cycle may be 10,000 pages per month.

It will be appreciated that the printer configuration data, or at least a portion of it, may be directly discoverable over the data network by an SNMP or other protocol query to the printer. For example, an additional embodiment of the method of the invention may comprise obtaining all or a portion of the configuration data directly from a printer via an SNMP query as opposed to obtaining the data from user input. In particular, a subset of steps may comprise configuration data items that may be pre-loaded on the printer by the manufacturer for reporting such as printer model number, serial number, a manufactured date, a recommended duty cycle, a printer location, and power consumption values (78). Configuration data comprising printer fixed cost data (72) and variable cost data (74) may remain as manual entry data items, or alternatively may likewise be able to be loaded onto the printers for automated reporting.

Referring once again to FIG. 3, the user provided printer configuration data is converted to a uniform format (78). Unlike the printer usage data discussed above which is continuously obtained from the printers, the printer configuration data will be entered by a user only once. The data will be stored in the printer information database, and may be available for edit or change by users when desired. As an example, if a printer's fixed price maintenance contract is renewed at a new price, the printer fixed cost data will need to be accessed and changed.

Once printer usage data and printer configuration data have been obtained, the printer information database may be built. Generally, the information database will be built by summarizing the gathered usage and configuration data, and by performing novel calculations using the data. The resulting printer information database comprises a set of information not available in the prior art, and provides an invaluable tool for network managers to utilize in solving many heretofore unresolved problems in the art.

Figure 4:
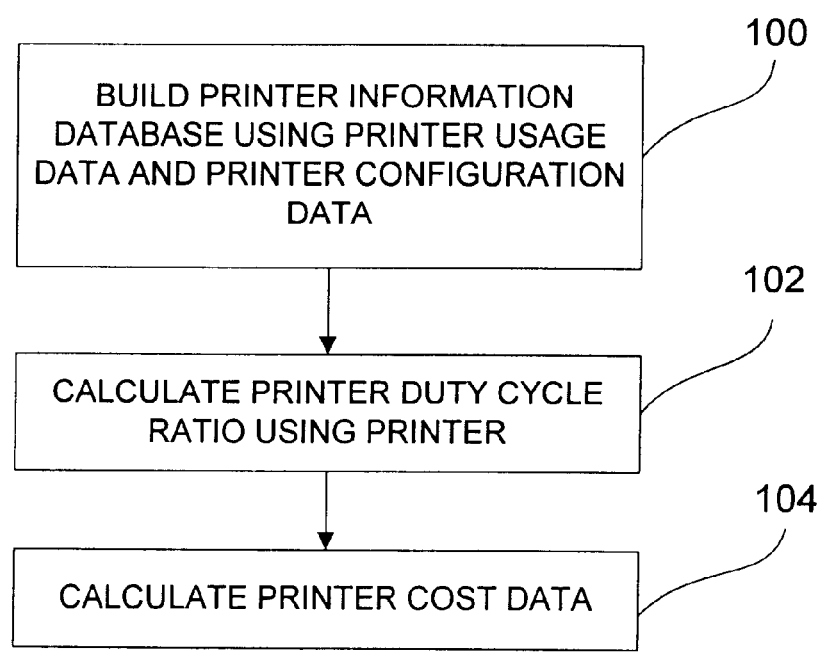
FIG. 4 is a flow chart illustrating an additional subset of steps of an embodiment of the invention for building a printer information database.

FIG. 4 is a flowchart illustrating the general steps of building the database. The central computer will build the database using the obtained printer configuration and usage data (100). It will be understood that in addition to the central computer 2, any computer device operably connected to the network 4 or to the central computer 2 could be used to build the printer information database. The central computer 2 has been specified as it has the computer usage and configuration data stored thereon. Further, as used herein the term "database" is intended only to refer to a set or group of data values. As will be appreciated by those knowledgeable in the art, commercially available database products such as Microsoft's Access that allow for easy organization and manipulation of data values may prove valuable for the practice of the invention, and are therefore preferred means for building of the database.

In building the preferred information database, a printer duty cycle ratio is calculated for each printer (102). This ratio may be calculated by:

$$(\text{actual pages printed during month})/(\text{recommended duty cycle})$$

where "actual pages per month" is determined from printer usage data, and "recommended duty cycle" is input by a user as printer configuration data. Actual pages per month may be determined by subtracting a printer's page count at the beginning of a month from its page count at the end of the month. It will be appreciated that the time value used in this equation may vary as desired. Although a value of a month has been specified, the calculation could be performed within the method of the invention to calculate a value based on a time value of per day, per hour, per minute, or any other desired time unit.

Often it will be helpful to view the printer information database calculation in graphical format. FIG. 5 illustrates a sample portion of printer information database data obtained from this calculation using hypothetical data for the printers of FIG. 1:

Thus, the hypothetical printer information database built through practice of the invention makes clear to a network manager that the printers 14 and 18 are under heavy loads, and that the printers 16 and 28 are under lighter loads. Using this information, the network manager will be able to make recommendations regarding the need for new printers, for re-locating existing printers, or for other network configuration adjustments that may be required.

Although not referred to in FIG. 4, the step of building the printer information database of the invention further preferably comprises making additional calculations using the printer usage data. In particular, printer job data obtained through querying the plurality of printers as indicated in the node 52 of FIG. 2 may be used to provide important printer usage data. The job data preferably comprises a size of job in pages, a time of job, and a job wait time. This data can be summed and reported as corresponding to time of day within the printer information database of the invention. As an example, hypothetical job data for the printers of FIG. 1 result in the following

TABLE 1

Printer Job Wait Time Data Summary

Avg. Wait Time (mins.) for Print Jobs

| | Printer 14 | Printer 16 | Printer 18 | Printer 28 | Avg. All Printers |
|---|---|---|---|---|---|
| 9–10 AM | 2.8 | 2.1 | 1.0 | 0.3 | 1.6 |
| 10–11 AM | 3.6 | 1.8 | 1.5 | 0.2 | 1.8 |
| 11–12 AM | 1.0 | 1.1 | 0.5 | 0.2 | 0.7 |
| 12–1 PM | 0 | 0 | 0 | 0 | 0 |
| 1–2 PM | 1.8 | 0 | 0.2 | 0 | 0.5 |
| 2–3 PM | 2.0 | 1.1 | 1. | 0 | 0.8 |
| 3–4 PM | 2.2 | 0.4 | 0.6 | 0 | 0.8 |
| 4–5 PM | 3.8 | 2.1 | 1.2 | 0 | 1.8 |
| 5–6 PM | 0.1 | 0 | 0 | 0 | 0 |

This novel preferred subset of the printer information database will be invaluable to the network manager in reducing network print job delay times. By way of example, a network manager could instruct users to re-direct print jobs during certain periods to avoid job delay times, or to re-schedule jobs to certain timeslots to minimize delay.

An additional set of calculations performed in building the printer information database of the invention comprises determining costs for printer output. A primary cost calculation as illustrated in FIG. 4 (104) determines an actual cost per unit of output for a particular printer. This calculation is performed by summing all of the fixed and variable costs for a printer for a desired unit of time, and dividing by the actual number of pages printed during that period of time: [Σ(fixed cost items per month)+Σ(variable cost items per month)]/(actual pages printed per month).

Through the present invention this calculation can be used to determine a more accurate value for per page cost than was heretofore available. Additionally, data is available for each individual printer. An example of the results of this calculation made during the building of the hypothetical printer information database of the invention using hypothetical data for the printers of FIG. 1 is presented in FIG. 6:

This portion of the printer information database data makes it clear to a network administrator that printers 14 and 28 have higher cost per page of output than other printers. Reference to FIG. 5 herein above would suggest that this may be a result of the relative low use of printer 28, and the relative high use of printer 14.

Costs associated with power consumption are preferably comprised in the cost per page calculations as a variable cost. These power costs may be estimated by determining the amount of time a given printer is in each of its various power consumption modes (obtained from usage data), multiplying these time values by power consumption rates in the particular mode (obtained from printer specification data) to calculate a total power consumed, and multiplying the total power consumed by the power utility cost (obtained from printer variable cost data). It is noted that due to current power costs, power consumption generally comprises a minor portion of the overall cost per page, and therefore that a useful cost per page can currently be computed without considering power consumption cost. It may very well be, however, that as power costs rise and printer power consumption rates rise that power consumption costs may become a significant variable cost component in the future.

Although not referred to in FIG. 4, additional cost calculations for the printer information database may also be comprised within the method of the invention. As an example, the same data as presented in FIG. 5 could be presented with printers identified by manufacturer model number to determine relative costs for the Acme Corp. By way of example, FIGS. 5 and 6 indicate that printers 16 and 18 are under similar duty cycle loads, but that printer 16 is producing output at a lower cost per page than printer 18. The user provided printer specification data of node 76 may indicate that printer 16 is an "HP LJ400", while printer 18 is an "HP LJ300". Using the fixed cost data for the HP LJ400, the savings that will be obtained by upgrading the current LJ 300 to an LJ 400 can be calculated, as well as the return on investment time for the new LJ 400.

It will be apparent to those knowledgeable in the art that the building of the printer information database of the invention may comprise the performance of a wide variety of additional calculations using the printer usage and printer configuration data discussed herein above. By way of example, costs could be calculated for each printer using the general method shown above for the printing of pages by individual page size, for color pages, or for printing on particular mediums such as transparencies.

The step of building the printer information database of the invention may be performed almost continuously as printer usage data is updated, and as new printer configuration data may be provided. The method of the invention may comprise allowing users to request updating of the database to initiate the various calculations. Also, the method of the invention may comprise storing past information database histories as new calculations are performed, so that a picture of network performance over time can be obtained.

It will also be appreciated that although the method of building a peripheral information database has been described herein as being practiced using printers, the method of the invention as claimed will be equally applicable to a wide variety of computer peripheral devices. Indeed, the term "peripheral" as used herein is intended to refer to any machine capable of operable connection to a computer processor based device, of which a printer is a preferred example. By way of example, other "peripherals" may comprise scanners, machine tools, robotic assembly machines, and the like. Additionally, it will be appreciated that the various steps of the method of the invention could be carried out in a different sequence or with some other variation to the manner in which they have been herein described and still be within the scope of the method as claimed.

Finally, it will be appreciated that the method of the present invention is well suited for practice by a computer, and therefore may comprise a computer program. It will be appreciated that the steps of the embodiments of the invention as described herein may therefore comprise computer executable instructions for a computer program product.

By way of example, an embodiment of the present invention may comprise a computer program product for building a printer information database for a plurality of printers operably connected to a communications network, the plurality of printers for sharing by a plurality of users, the computer program product comprising a computer usable medium having computer readable program code embodied in the medium that when executed causes the central computer 2 of FIG. 1 to: obtain printer configuration data input over the network 4; to repeatedly query each of the plurality of printers 14–18 and 28 over the network 4 at a desired frequency for printer usage data using a network communications protocol query; and to build the printer information database using the printer usage data and the printer configuration data; the printer information database comprising at least average printed page cost for each of the plurality of printers and a printer duty cycle ratio for each of the plurality of printers. It will be likewise appreciated that the computer program embodiment of the invention may comprise recorded instructions to cause a computer to execute other various steps of the embodiments of the method of the invention as discussed herein.

The various embodiments of the method and computer program product of the present invention thereby solve many heretofore unresolved problems in a novel and elegant manner. In particular, effective management and administration of peripherals that may be distributed about a large network may be achieved. More accurate peripheral usage patterns and trends than ever before possible are obtained for each individual peripheral in an automated and accurate manner. This information can be used to achieve greater peripheral efficiency than was previously possible. Additionally, practice of the present invention allows for peripheral cost accounting information to be determined with a degree of accuracy and detail never before possible.

While preferred embodiments and example configurations have been shown and described, it is to be understood that various further modifications and additional configurations will be apparent to those skilled in the art. As an example, it will be appreciated that the method of the present invention could be practiced with non-networked printers through manual reporting of data. It is intended that the specific embodiments and configurations herein disclosed are illustrative of the preferred and best modes for practicing the invention, and should not be interpreted as limitations on the scope of the invention as defined by the appended claims.

Various features of the invention are set forth in the appended claims.

What is claimed is:

1. A method for building an information database for a plurality of network peripherals, comprising the steps of:

repeatedly querying the plurality of network peripherals for output count data;

obtaining peripheral cost data; and, building a peripheral information database for each of the plurality of peripherals using said output count data and said cost data, the peripheral information database comprising at least an operating cost for the peripheral.

2. A method for building a peripheral information database as defined by claim 1 wherein the method further comprises the steps of:

designating a first portion of the plurality of peripherals as high use peripherals and designating a second portion of the plurality of peripherals as low use; and, querying said high use peripherals at a first rate of frequency for said output count data and querying said low use peripherals at a second rate of frequency for said output count data, said second rate of frequency less than said first rate of frequency.

3. A method for building a peripheral information database as defined by claim 1 wherein said peripheral cost data comprises fixed and variable cost data, said fixed cost data comprising one of either a peripheral depreciation value or a peripheral lease value, and wherein said average operating cost is calculated using said fixed and variable cost data.

4. A method for building a peripheral information database as defined by claim 1 wherein the method further comprises the step of obtaining peripheral recommended output duty cycle data and wherein said step of building the peripheral information database further comprises calculating a duty cycle ratio for the peripheral.

5. A method for building a peripheral information database as defined by claim 1 wherein the plurality of peripherals are of the type that consume a supply to produce output, and wherein the method further comprises the step of repeatedly querying the plurality of network peripherals for a supply level.

6. A method for building a peripheral information database as defined by claim 1 wherein the method is for use with a central computer and a communications network, wherein said step of repeatedly querying the plurality of network peripherals for output count comprises repeatedly querying said plurality of peripherals from the central computer over the communications network, wherein said step of obtaining said peripheral cost data comprises accepting said cost data input over the communications network to the central computer by a user, and wherein said step of building a peripheral information database further comprises building said database with the central computer.

7. A method for building a peripheral information database as defined by claim 1 wherein the peripheral consumes power to produce output, and wherein the method further comprises the step of repeatedly querying the peripheral for a power consumption level.

8. A method for building a printer information database for a plurality of printers connected to a communications network, the method utilizing a central computer connected to the communications network, the method comprising the steps of:

repeatedly querying the plurality of printers over the network from the central computer for printer page count data;

accepting printer cost data input from at least a user over the network to the central computer; and, building the printer information database with the central computer using said printer page count data and said printer cost data, the printer information database comprising at least a printer operating cost on a cost per printed page basis.

9. A method for building a printer information database as defined by claim 8 wherein the method further comprises the step of repeatedly querying the plurality of printers for color page count, page count by paper size, and marking agent level.

10. A method for building a printer information database as defined by claim 8 wherein said printer cost data comprises printer fixed and variable cost data, said fixed cost data comprising one of either a printer depreciation cost or a printer lease cost.

11. A method for building a printer information database as defined by claim 8 wherein the method further comprises the step of obtaining a recommended printer duty cycle, and wherein said step of building a printer information database further comprises calculating at least a duty cycle ratio.

12. A method for building a printer information database as defined by claim 8 wherein the method further comprises:

designating a first portion of the plurality of printers high use printers and designating a second portion of the plurality of printers low use printers, and, querying said high use printers for printer page count data at a first frequency, querying said low use printers for printer page count data at a second frequency, said second frequency lower than said first frequency.

13. A method for building a printer information database as defined by claim 8 wherein the method further comprises repeatedly querying the plurality of printers at a first frequency for page count data and repeatedly querying the plurality of printers at a second frequency for page count by paper size, said first frequency higher than said second frequency.

14. A method for building a printer information database as defined by claim 8 wherein the method further comprises the steps of:
   obtaining at least one printer power consumption value;
   repeatedly querying the plurality of printers for marking agent usage data;
   wherein said cost data comprises fixed and variable cost data, said fixed cost data comprising a maintenance contract cost and one of either a printer depreciation cost or a printer lease cost, said variable cost data comprising at least a paper cost and a marking agent cost; and,
   wherein the printer information database comprises at least printer operating cost on a per page basis, said printer operating cost calculated using said configuration data fixed cost data, said configuration variable cost data, said printer power usage data, said marking agent usage data, and said page count data.

15. A method for building a printer configuration database as defined by claim 8 wherein the method further comprises the step of querying the plurality of printers over the communications network from the central computer for a printer model number, a printer serial number, and a printer duty cycle.

16. A method for building a printer information database as defined by claim 8 wherein the method further comprises the step of repeatedly querying the plurality of printers over the communications network for print job data comprising at least job wait time, and wherein said printer information database further comprises at least an average wait time for each of the plurality of printers.

17. A method for building a printer information database for a plurality of printers connected to a communications network, the plurality of printers for sharing among a plurality of users, the method utilizing a central computer connected to the communications network, the method comprising the steps of:
   obtaining printer configuration data with the central computer over the network, said printer configuration data comprising at least:
      printer fixed cost data comprising one of either a printer depreciation cost or a printer lease cost;
      printer variable cost data comprising printer supply item costs;
      printer recommended duty cycle data;
      printer power consumption data;
   repeatedly querying the plurality of printers from the central computer for printer usage data, said printer usage data comprising at least:
      page count data;
      print job data comprising at least print job wait time;
      power consumption status;
      current time value; and,
   building the printer information database with said central computer using said printer configuration data and said printer usage data for each of the plurality of printers, said printer information database comprising at least:
      a printer operating cost for each printer calculated by summing said fixed cost data with said variable cost data and dividing by total pages printed; a printer duty cycle ratio calculated by dividing actual pages printed by said recommended duty cycle.

18. A method for building a printer information database for a plurality of printers as defined by claim 17, wherein the method further comprises the steps of:
   designating a portion of said usage data as high priority usage data and a portion as low priority usage data; and,
   querying said plurality of printers at a first frequency for said high priority usage data at a first frequency and querying said plurality of printers at a second frequency for said low priority usage data, said first frequency higher than said second frequency.

19. A computer program product for building a printer information database for a plurality of printers connected to a communications network, the computer program comprising a computer usable medium having computer readable program code embodied in the medium that when executed causes a central computer connected to the communications network to:
   obtain printer cost data and printer recommended duty cycle data;
   repeatedly query each of the plurality of printers over the network at a desired frequency for at least a page count; and
   build the printer information database using said page count and said printer cost data, said printer information database comprising at least average printed page cost for each of the plurality of printers and a printer duty cycle ratio for each of the plurality of printers.

20. A computer program product as defined by claim 18, wherein said printer cost data comprises printer fixed cost data and printer variable cost data, said fixed cost data comprising one of a printer lease cost or a printer depreciation cost, and wherein said average printed page cost is calculated by summing total printer fixed cost data with total printer variable cost data and dividing by total pages printed.

21. A computer program product for building a printer information database as defined by claim 18, wherein causing the central computer to obtain said cost data comprises causing the central computer to accept said cost data input over the data network from at least a user.

22. A computer program product for building a printer information database for a plurality of printers connected to a communications network, the plurality of printers for sharing by a plurality of users, the computer program product comprising a computer usable medium having computer readable program code embodied in the medium that when executed causes a central computer connected to the communications network to:
   obtain printer configuration data over the data network, said printer configuration data comprising at least:
      printer fixed cost data comprising one of either printer depreciation cost or printer lease cost;
      printer variable cost data comprising printer supply item costs;
      printer recommended duty cycle value;
      printer power consumption data;
   designate a first portion of the plurality of printers as high use;
   designate a second portion of the printers as low use;
   repeatedly query said high use printers at a first frequency for printer usage data, and repeatedly query said low use printers at a second frequency for printer usage data, said first frequency greater than said second frequency, said printer usage data comprising at least:
      page count data;

print job data comprising at least print job wait time;
power consumption status;
current time value;
build the printer information database using said printer configuration data and said printer usage data for each of the plurality of printers, said printer information database comprising at least:

a printer operating cost for each printer calculated by summing said fixed cost data with said variable cost data and dividing by total pages printed;
a printer duty cycle ration calculated by dividing actual pages printed by said recommended duty cycle.

* * * * *

UNITED STATES PATENT AND TRADEMARK OFFICE
CERTIFICATE OF CORRECTION

PATENT NO. : 6,795,829 B2
DATED : September 21, 2004
INVENTOR(S) : Abraham D. Alsop It is certified that error appears in the above-identified patent and that said Letters Patent is hereby corrected as shown below:

Column 8,
Line 67, after "following" insert -- Table 1 that illustrates a portion of the printer information database: --

Column 10,
Line 1, delete "FIG. 5" and insert therefor -- FIG. 6 --

Signed and Sealed this

Fifth Day of April, 2005

JON W. DUDAS
*Director of the United States Patent and Trademark Office*